United States Patent
Ito et al.

(10) Patent No.: US 9,742,978 B2
(45) Date of Patent: Aug. 22, 2017

(54) INFORMATION PROCESSING DEVICE, IMAGING DEVICE, IMAGING SYSTEM, CONTROL METHOD FOR INFORMATION PROCESSING DEVICE, CONTROL METHOD FOR IMAGING DEVICE, AND PROGRAM

(71) Applicant: Sony Corporation, Tokyo (JP)

(72) Inventors: Ryogo Ito, Tokyo (JP); Shiro Eshita, Tokyo (JP); Kazuma Akamatsu, Tokyo (JP); Megumi Takagi, Kanagawa (JP); Ayumi Yamamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/916,350

(22) PCT Filed: Aug. 18, 2014

(86) PCT No.: PCT/JP2014/071573
§ 371 (c)(1),
(2) Date: Mar. 3, 2016

(87) PCT Pub. No.: WO2015/072201
PCT Pub. Date: May 21, 2015

(65) Prior Publication Data
US 2016/0219210 A1  Jul. 28, 2016

(30) Foreign Application Priority Data
Nov. 14, 2013 (JP) .................. 2013-235934

(51) Int. Cl.
*H04N 5/232* (2006.01)
*H04N 5/235* (2006.01)

(52) U.S. Cl.
CPC ....... *H04N 5/23206* (2013.01); *H04N 5/2353* (2013.01); *H04N 5/23203* (2013.01);
(Continued)

(58) Field of Classification Search
CPC .......... H04N 5/23206; H04N 5/23216; H04N 5/2353; H04N 5/23296
(Continued)

(56) References Cited

U.S. PATENT DOCUMENTS

2006/0061663 A1* 3/2006 Park ................... H04N 5/23293
348/211.2
2006/0268158 A1* 11/2006 Ishiyama ........... H04N 5/23209
348/373
(Continued)

FOREIGN PATENT DOCUMENTS

JP        2009-094591 A     4/2009
WO    WO-2013/161583 A1   10/2013

OTHER PUBLICATIONS

Extended European Search Report dated Mar. 8, 2017 for corresponding European Application No. 14861530.5.

*Primary Examiner* — Antoinette Spinks
(74) *Attorney, Agent, or Firm* — Michael Best & Friedrich LLP

(57) ABSTRACT

An appropriate user interface corresponding to use forms of the devices is provided.

An imaging system includes an imaging device and an information processing device. The imaging device is connected to an information processing device by utilizing wireless communication so that imaging operation is controlled on a basis of an operational input performed in the information processing device. The information processing device performs control for switching a role of an operation member included in the information processing device on a basis of relative positional relationship with the imaging device.

10 Claims, 11 Drawing Sheets

(52) U.S. Cl.
CPC ..... *H04N 5/23209* (2013.01); *H04N 5/23216* (2013.01); *H04N 5/23296* (2013.01)

(58) Field of Classification Search
USPC ..................................................... 348/211.8
See application file for complete search history.

(56) References Cited

U.S. PATENT DOCUMENTS

| | | | | |
|---|---|---|---|---|
| 2007/0268371 | A1* | 11/2007 | Misawa | H04N 5/2252 348/207.99 |
| 2007/0291014 | A1* | 12/2007 | Layton | G06F 3/03547 345/173 |
| 2010/0214465 | A1* | 8/2010 | Suzuki | G06F 3/04886 348/333.02 |
| 2010/0266269 | A1* | 10/2010 | Nagao | H04N 5/23293 396/49 |
| 2012/0307019 | A1 | 12/2012 | Centen et al. | |
| 2013/0141640 | A1* | 6/2013 | Kim | H04N 5/2254 348/375 |
| 2013/0182138 | A1* | 7/2013 | Cho | G06F 9/4445 348/211.3 |

* cited by examiner

FIG. 1
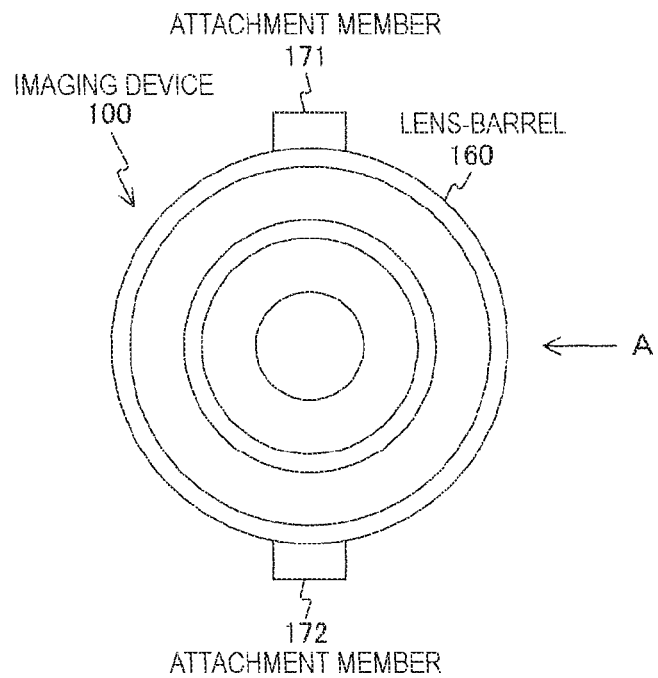
a
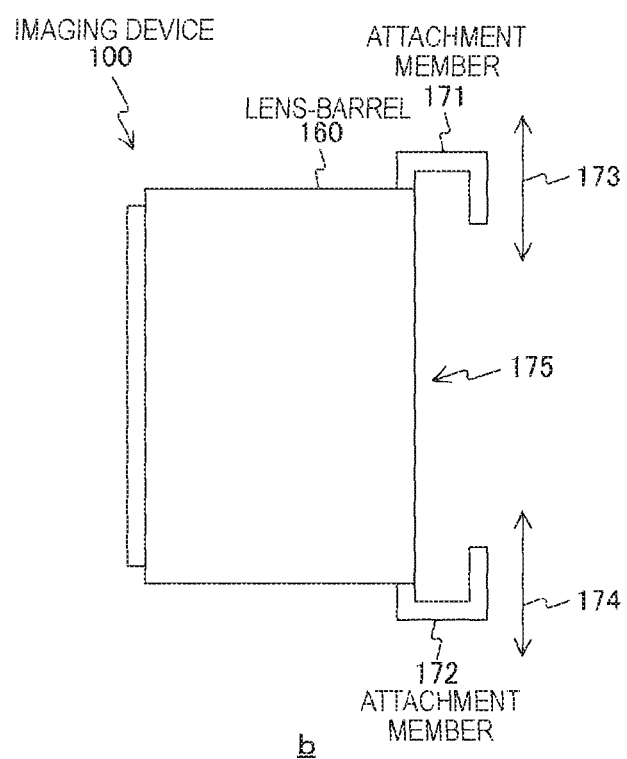
b

FIG. 2
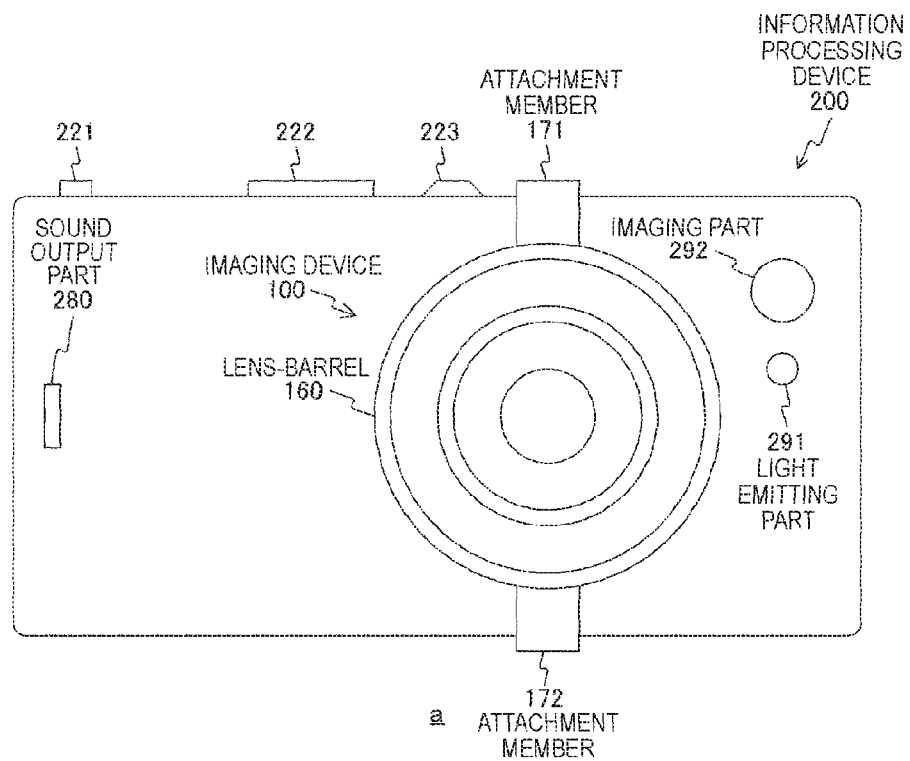
a
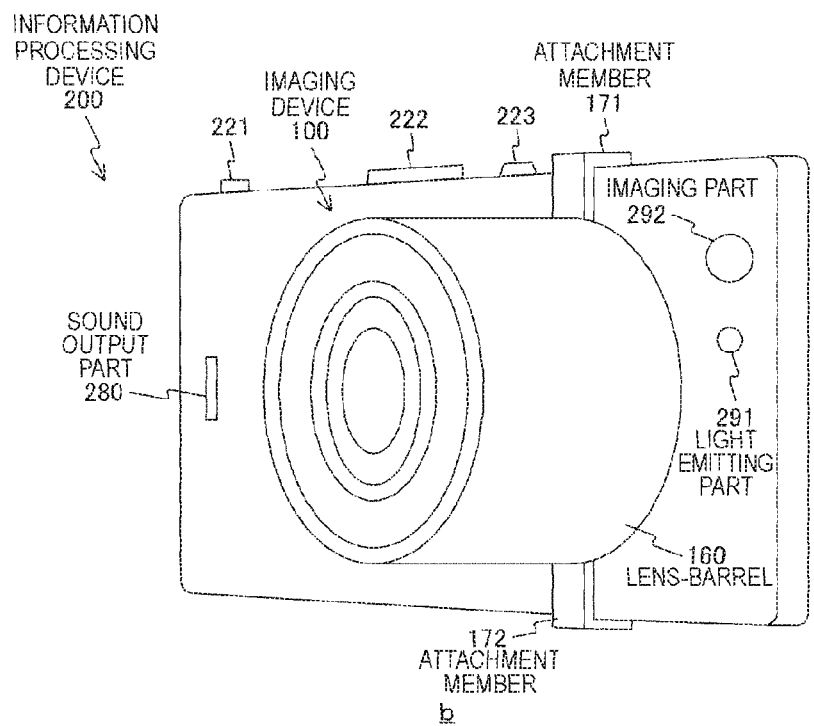
b

FIG. 4
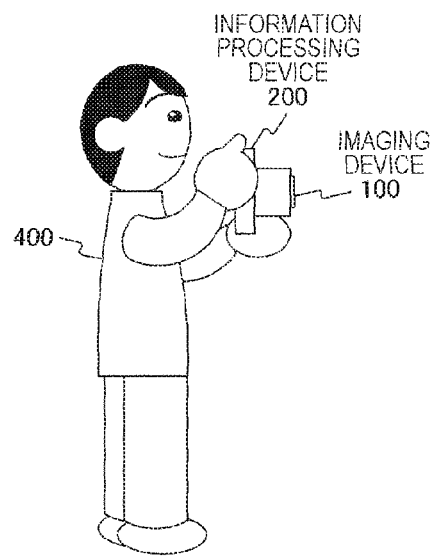
a
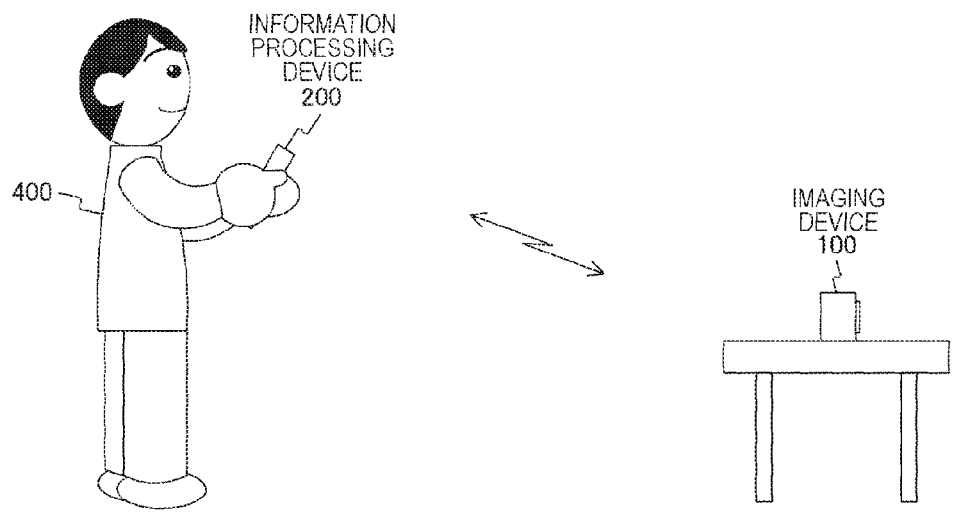
b

FIG. 5
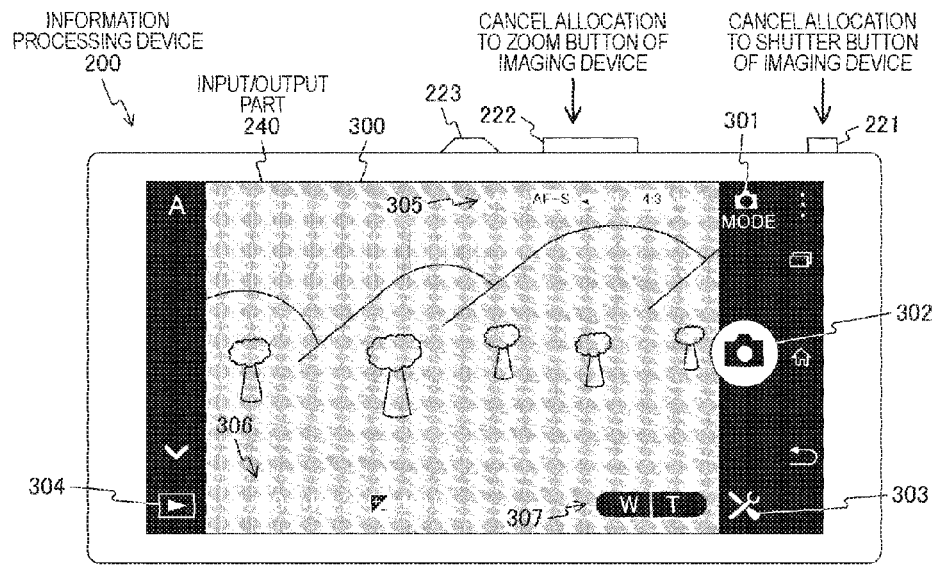
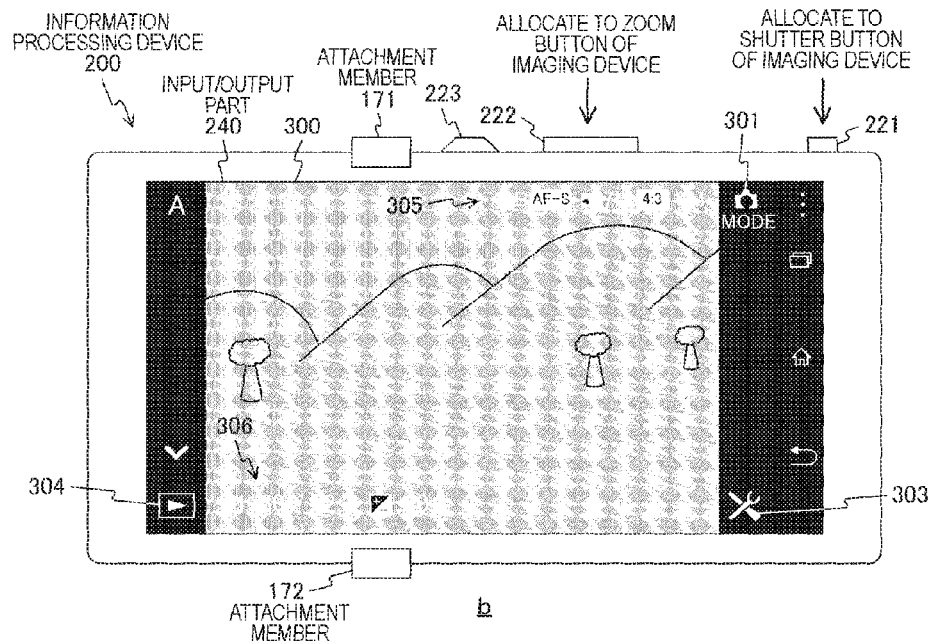

FIG. 10

EXAMPLE OF SWITCHING POWER BUTTON ON BASIS OF CONNECTION RELATION
BETWEEN IMAGING DEVICE AND INFORMATION PROCESSING DEVICE

|  | BUTTON SHORT-PRESSED | BUTTON LONG-PRESSED |
|---|---|---|
| CASE WHERE MOUNTING WORK OF IMAGING DEVICE ON INFORMATION PROCESSING DEVICE IS NOT IN OPERATION | DISPLAY SCREEN IS TURNED OFF (LOCK SCREEN IS DISPLAYED BY ANOTHER SHORT-PRESSING) | CONFIRMATION SCREEN FOR CONFIRMING WHETHER TO TURN OFF POWER IS DISPLAYED |
| CASE WHERE MOUNTING WORK OF IMAGING DEVICE ON INFORMATION PROCESSING DEVICE IS IN OPERATION | INVALID | CONFIRMATION SCREEN FOR CONFIRMING WHETHER TO TURN OFF POWER IS DISPLAYED |

INFORMATION PROCESSING DEVICE, IMAGING DEVICE, IMAGING SYSTEM, CONTROL METHOD FOR INFORMATION PROCESSING DEVICE, CONTROL METHOD FOR IMAGING DEVICE, AND PROGRAM

TECHNICAL FIELD

The present technology relates to an information processing device and an imaging device. In detail, the present technology relates to the information processing device that controls imaging operation, an imaging device, an imaging system and a controlling method thereof, and a program that makes a computer execute the method.

BACKGROUND ART

An imaging device such as a digital still camera or a digital video camera (for instance, a camera integrated type recorder) that images an object, generates an image (image data) and records the image as contents has been widely spread. Also, there exists a wireless communication technology of exchanging various kinds of data utilizing wireless communication.

Also, there exists a technology of operating an imaging device by another device utilizing wireless communication. For instance, there is proposed an electronic device that, when a contact operation to an operation switch image displayed at a display part is detected, makes an imaging device execute an operation corresponding to the operation switch image on which the contact operation has been performed (for instance, refer to Patent Literature 1).

CITATION LIST

Patent Literature

Patent Literature 1: JP 2009-94591A

SUMMARY OF INVENTION

Technical Problem

In the above-mentioned related art, since the imaging device is operated by the electronic device utilizing the wireless communication, for instance, even when the imaging device and the electronic device are at a distance, the imaging device is operated using the electronic device.

Here, assume the case where, for instance, an imaging device is mounted on an information processing device that can operate the imaging device by utilizing the wireless communication to perform imaging operation. In this case, it is assumed that a use form of the imaging device and the information processing device is different from the use form in the case where imaging operation is performed by the imaging device provided at a distant position. Accordingly, in the case of using the imaging device and the information processing device to perform imaging operation, it is important to provide an appropriate user interface in accordance with the use form.

In view of such circumstances, according to the present technology, there is provided an appropriate user interface corresponding to use forms of the devices.

Solution to Problem

The present technology has been devised to solve the above-described problem. A first aspect thereof resides in an information processing device, a control method therefor, and a program for causing a computer to execute the control method, the information processing device including: a control part configured to perform control for switching a role of an operation member included in the information processing device on a basis of relative positional relationship with an imaging device. This brings about an action of switching the role of the operation member included in the information processing device on the basis of relative positional relationship with the imaging device.

According to the first aspect, he control part may perform control for switching the role of the operation member on a basis of whether or not the imaging device is mounted on the information processing device. This brings about an action of switching the role of the operation member on the basis of whether or not the imaging device is mounted on the information processing device.

According to the first aspect, the control part may perform control for displaying at a display part an operation object for operating the imaging device when the imaging device is not mounted on the information processing device, and for allocating a role corresponding to the operation object to the operation member and deleting the operation object from the display part when the imaging device is mounted on the information processing device. This brings about an action of displaying at the display part an operation object for operating the imaging device when the imaging device is not mounted on the information processing device, and allocating the role corresponding to the operation object and deleting the operation object from the display part when the imaging device is mounted on the information processing device.

According to the first aspect, the control part may perform control for displaying at the display part both an operation object for performing zoom operation of the imaging device and an operation object for performing shutter operation of the imaging device when the imaging device is not mounted on the information processing device, and for allocating a role of performing the zoom operation to the operation member configured to adjust a sound volume of the information processing device, and allocating a role of performing the shutter operation to the operation member configured to perform shutter operation of the information processing device when the imaging device is mounted on the information processing device. This brings about an action of displaying at the display part both an operation object for performing zoom operation of the imaging device and an operation object for performing shutter operation of the imaging device when the imaging device is not mounted on the information processing device, and allocating a role of performing the zoom operation to the operation member configured to adjust a sound volume of the information processing device and allocating a role of performing the shutter operation to the operation member configured to perform shutter operation of the information processing device when the imaging device is mounted on the information processing device.

According to the first aspect, when the role of the operation member is switched, the control part may perform control for outputting notification information to indicate the switching. This brings about an action of outputting notification information to indicate the switching when the role of the operation member is switched.

A second aspect of the present technology resides in an imaging device, a control method therefor, and a program for causing a computer to execute the control method, the imaging device including: a control part configured to control imaging operation on a basis of an operational input performed in an information processing device, the information processing device including an operation member having a role being switched on a basis of relative positional relationship between the imaging device and the information processing device. This brings about an action of controlling imaging operation on the basis of an operational input performed in the information processing device with the operation member or a display screen.

According to the second aspect, the role of the operation member may be switched on a basis of whether or not the imaging device is mounted on the information processing device. This brings about an action of switching the role of the operation member on the basis of whether or not the imaging device is mounted on the information processing device.

According to the second aspect, an operation object for operating the imaging device may be displayed at the display part when the imaging device is not mounted on the information processing device, and a role corresponding to the operation object may be allocated to the operation member, and the operation object may be deleted from the display part when the imaging device is mounted on the information processing device. This brings about an action of displaying the operation object for operating the imaging device at the display part when the imaging device is not mounted on the information processing device, and allocating the role corresponding to the operation object to the operation member and deleting the operation object from the display part when the imaging device is mounted on the information processing device.

According to the second aspect, both an operation object for performing zoom operation of the imaging device and an operation object for performing shutter operation of the imaging device may be displayed at the display part when the imaging device is not mounted on the information processing device, and when the imaging device is mounted on the information processing device, a role of performing the zoom operation may be allocated to the operation member configured to adjust a sound volume of the information processing device, and a role of performing the shutter operation may be allocated to the operation member configured to perform shutter operation of the information processing device. This brings about an action of displaying at the display part both an operation object for performing zoom operation of the imaging device and an operation object for performing shutter operation of the imaging device when the imaging device is not mounted on the information processing device, and allocating a role of performing the zoom operation to the operation member configured to adjust a sound volume of the information processing device and allocating a role of performing the shutter operation to the operation member configured to perform shutter operation of the information processing device when the imaging device is mounted on the information processing device.

According to the second aspect, when the role of the operation member is switched, notification information to indicate the switching may be output from the information processing device. This brings about an action of outputting notification information to indicate the switching from the information processing device when the role of the operation member is switched.

A third aspect of the present technology resides in an imaging system, a control method therefor, and a program for causing a computer to execute the control method, the imaging system including: an imaging device configured to be connected to an information processing device by utilizing wireless communication so that imaging operation is controlled on a basis of an operational input performed in the information processing device; and the information processing device configured to perform control for switching a role of an operation member included in the information processing device on a basis of relative positional relationship with the imaging device. This brings about an action that in the imaging device, the imaging operation is controlled on the basis of an operational input performed in the information processing device and that in the information processing device, the role of the operation member included in the information processing device is switched on the basis of relative positional relationship with the imaging device.

Advantageous Effects of Invention

According to the present technology, an excellent effect of providing an appropriate user interface corresponding to a use form of the devices can be implemented. The effect described here is not limited, thereto, and may be one of the effects described in the present disclosure

BRIEF DESCRIPTION OF DRAWINGS

FIG. 1 is a diagram illustrating an appearance configuration of an imaging device 100 in a first embodiment of the present technology.

FIG. 2 is a diagram illustrating an appearance configuration when attaching the imaging device 100 to an information processing device 200 in the first embodiment of the present technology.

FIG. 4 is a diagram illustrating a use example of the imaging device 100 and the information processing device 200 in the first embodiment of the present technology.

FIG. 5 is a diagram illustrating a display screen displayed at an input/output part 240 and an example of switching the operation members in the first embodiment of the present technology.

FIG. 10 is a diagram illustrating an example of operation switching by pressing operation of an operation member 223 (power button) in a second embodiment of the present technology.

DESCRIPTION OF EMBODIMENTS

Figure 3:
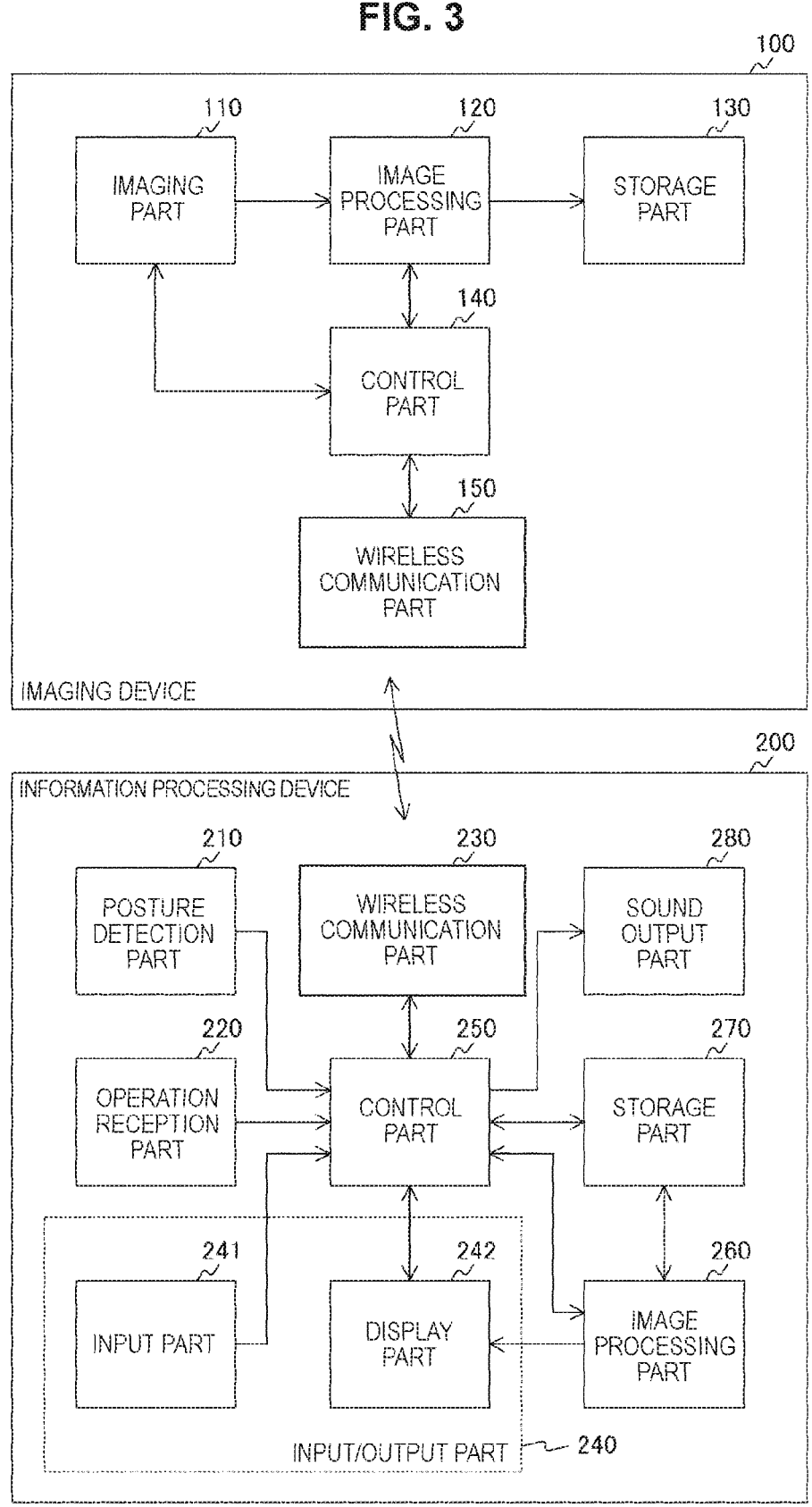
FIG. 3 is a block diagram illustrating a functional configuration example of the imaging device 100 and the information processing device 200 in the first embodiment of the present technology.

Hereinafter, a mode for carrying out the present technology (hereinafter referred to as an embodiment) will be described. The description will be given in the following order.

1. First Embodiment (Example of switching role of operation member included in information processing device on basis of relative positional relationship between imaging device and information processing device)

2. Second Embodiment (Example of preventing malfunction due to contact with operation member when imaging device is mounted on information processing device)

1. First Embodiment

[Appearance Configuration Example of Imaging Device]

FIG. 1 is a diagram illustrating an appearance configuration of an imaging device 100 in the first embodiment of the present technology. A front view of the imaging device 100 is illustrated in FIG. 1a, and a side view (a side view in the case of view from an arrow A) of the imaging device 100 is illustrated in FIG. 1b.

Also, in the embodiment of the present technology, an example is illustrated in which the imaging device 100 is a cylindrical (columnar) imaging device (for instance, a lens style camera). That is, an example is illustrated in which the shape of the imaging device 100 is a shape of a lens part alone taken out of a general imaging device (for instance, an incorporated type camera). The imaging device 100 includes operation members such as a zoom lever and a shutter button; however, illustrations thereof are omitted in FIG. 1 or the like. Also, the imaging device 100 is, for instance, embodied by a digital still camera or a digital video camera (for instance, a camera incorporated type recorder).

The imaging device 100 includes a lens-barrel 160 and attachment members 171 and 172. The lens-barrel 160 houses each of the members, such as an optical system and an imaging system.

The attachment members 171 and 172 are attachments used when attaching the imaging device 100 to another device (for instance, an information processing device 200 illustrated in FIG. 2). For instance, by moving the attachment member 171 in a direction of an arrow 173 and moving the attachment member 172 in a direction of an arrow 174 corresponding to a shape and a size of another device, the imaging device 100 can be attached to the device. That is, the attachment members 171 and 172 are attachments for fixing the imaging device 100 to another device. Also, an attachment surface in the case of mounting the imaging device 100 on another device is illustrated as a mounting surface 175 (a surface on the opposite side of a surface on a lens side illustrated in FIG. 1a). Also, an example of the case of attaching the imaging device 100 to another device is illustrated in FIG. 2.

In this way, the imaging device 100 can, for instance, perform a normal imaging operation and be mounted on another device (for instance, a smartphone) and used. Also, in the case of being mounted on another device and used, the imaging device 100 can be operated by remote control using another device.

[Attachment Example of Imaging Device]

FIG. 2 is a diagram illustrating an appearance configuration in the case of attaching the imaging device 100 to the information processing device 200 in the first embodiment of the present technology.

An example of the case of attaching the imaging device 100 to one surface (a surface provided with an imaging part 292) of the information processing device 200 is illustrated in FIG. 2a and FIG. 2b. In FIG. 2a, a front view in the case of attaching the imaging device 100 to the information processing device 200 is illustrated. Also, in FIG. 2b, a perspective view in the case of attaching the imaging device 100 to the information processing device 200 is illustrated.

The information processing device 200 includes operation members 221 to 223, an input/output part 240 (illustrated in FIG. 3 and the like), a sound output part 280, a light emitting part 291, and the imaging part 292. Also, the information processing device 200 is embodied by an information processing device such as a smartphone, or a tablet terminal, for instance.

The operation members 221-223 are the operation members used when performing various kinds of operation input. For instance, the operation member 221 is the operation member (the shutter button (the shutter key)) used when performing a shutter operation (an operation for recording an image (image data) generated by the imaging part 292 as image contents) of the information processing device 200. Also, the operation member 222 is the operation member (a sound volume adjustment button (a sound volume bar)) used when performing an operation for adjusting a sound volume output from the sound output part 280. The operation member 223 is the operation member (the power button) used when performing ON/OFF operations of a power source of the information processing device 200.

The input/output part 240 displays various kinds of images, and receives the operation input from a user on the basis of the detected state of an object which is adjacent to or in contact with a display surface of the input/output part 240.

The sound output part 280 outputs various kinds of sound information.

The light emitting part 291 is a light emitting device which emits light to an object. The light emitting part 291 is used when performing an imaging operation using the information processing device 200 in an environment where it is difficult to expect sufficient brightness such as the nighttime or indoor, for instance.

The imaging part 292 images an object and generates an image (image data).

As illustrated in FIG. 2, by the attachment members 171 and 172 of the imaging device 100 holding a main body of the information processing device 200 between them, the imaging device 100 can be fixed to the information processing device 200. Also, the imaging device 100 may be attached to another part (a part other than the part illustrated in FIG. 2) in the information processing device 200.

[Functional Configuration Example of Imaging Device and Information Processing Device]

FIG. 3 is a block diagram illustrating a functional configuration example of the imaging device 100 and the information processing device 200 in the first embodiment of the present technology. Also, an imaging system constituted of the imaging device 100 and the information processing device 200 is one example of an imaging system described in the scope of claims.

The imaging device 100 includes an imaging part 110, an image processing part 120, a storage part 130, a control part 140, and a wireless communication part 150.

The imaging part 110 images an object and generates an image (image data) on the basis of control of the control part 140, and outputs the generated image to the image processing part 120. The imaging part 110 is, for instance, constituted of an optical system (a plurality of lenses) and an imaging element. Also, individual parts (for instance, a zoom lens, a focus lens, a diaphragm) of the imaging part 110 are controlled under the control of the control part 140. In the embodiment of the present technology, it is assumed that a reference to "image" includes senses of both image itself and image data for displaying the image.

The image processing part 120 executes predetermined image processing (for instance, demosaic processing) for the image output from the imaging part 110 under the control of the control part 140, and the image subjected to the image processing is stored in the storage part 130. The image subjected to the image processing by the image processing part 120 may be transmitted to the information processing device 200 utilizing wireless communication and stored in a storage part 270.

The storage part 130 is a recording medium that stores the image subjected to the image processing by the image processing part 120 as contents (for instance, a still image file, a moving image file). The storage part 130 may be built in the imaging device 100 or may be attachable and detachable to/from the imaging device 100.

The control part 140 controls the individual parts in the imaging device 100 on the basis of a control program. For instance, the control part 140 controls the individual parts on the basis of the operation input received by the operation members (now shown) such as the zoom lever or the shutter button provided in the imaging device 100. Also, the control part 140 controls the individual parts on the basis of control information from the information processing device 200 received through the wireless communication part 150. That is, the imaging device 100 can be remotely controlled using the information processing device 200.

The wireless communication part 150 transmits and receives individual pieces of information (for instance, control data, image data) to/from another information processing device (for instance, the information processing device 200) utilizing the wireless communication under the control of the control part 140.

Here, as the wireless communication, for instance, near field communication (NFC), a wireless local area network (LAN) may be used. As the wireless LAN, for instance, wireless fidelity (Wi-Fi) may be used. Also, as the wireless communication, for instance, the wireless communication of Bluetooth®, infrared rays, and portable radio waves or the like may be used.

Also, a plurality of wireless communication systems may be used. For instance, at the start of the wireless communication, only a power source is turned on and data (for instance, a service set identifier (SSID)) related to the Wi-Fi is exchanged by the NFC. Then, data is exchanged thereafter through the Wi-Fi.

Also, for instance, when detecting mounting of the imaging device 100 on the information processing device 200, exchange of data by the NFC may be used. Also, the image data and the control data can be exchanged between the imaging device 100 and the information processing device 200 utilizing the Wi-Fi.

The information processing device 200 includes a posture detection part 210, an operation reception part 220, a wireless communication part 230, the input/output part 240, a control part 250, an image processing part 260, the storage part 270, and the sound output part 280.

The posture detection part 210 detects change in a posture of the information processing device 200 by detecting an acceleration, movement and inclination or the like of the information processing device 200, and outputs posture information related to the detected change in the posture to the control part 250. As the posture detection part 210, for instance, various kinds of sensors such as a gyro sensor or an acceleration sensor may be used.

The operation reception part 220 is the operation reception part that receives the operation performed by the user, and outputs the control information (operation information) according to the received operation contents to the control part 250. The operation reception part 220 corresponds to, for instance, the operation members 221 to 223 illustrated in FIG. 2.

The wireless communication part 230 transmits and receives individual pieces of information (for instance, the control data, the image data) to/from another information processing device (for instance, the imaging device 100) utilizing the wireless communication under the control of the control part 250. As the wireless communication, for instance, the above described wireless LAN (for instance, the Wi-Fi), the NFC. Bluetooth, infrared rays or portable radio waves or the like may be used. Also, the plurality of wireless communication systems may be used.

For the input/output part 240, an input part 241 and a display part 242 are configured as one body. Also, the input/output part 240 displays various kinds of images on the display part 242 under the control of the control part 250, and receives the operation input from the user by the input part 241 on the basis of the detected state of an object which is adjacent to or in contact with a display surface of the display part 242. The input part 241 outputs the control information according to the received operation input to the control part 250.

For instance, as the input part 241, there may be used an electrostatic type (electrostatic capacity type) touch panel that detects contact or approach of a conductive object (for instance, a finger of a person) on the basis of change in electrostatic capacity. Also, for instance, as the display part 242, there may be used a display panel such as a liquid crystal display (LCD) or an organic electro luminescence (EL) panel. Then, the input/output part 240 is configured by superimposing a transparent touch panel on the display surface of the display panel, for instance.

For instance, the user can operate the information processing device 200 and the imaging device 100 by performing a contact operation (or an adjacent operation) of an operation object or the like displayed at the display part 242. Here, the operation object is displayed at the input/output part 240 like operation objects 301 and 307 illustrated in a of FIG. 5, for instance, and is an operation button a graphical user interface (GUI) button or the like for performing the operation input.

The control part 250 controls the individual parts in the information processing device 200 on the basis of a control program. For instance, the control part 250 determines the posture of the information processing device 200 on the basis of the posture information from the posture detection part 210, and switches a display form of the display screen to be displayed at the input/output part 240 based on the determination result. For instance, the control part 250 determines a vertical direction of the posture of the information processing device 200 on the basis of the posture information from the posture detection part 210, and switches the vertical direction of the display screen to be displayed at the input/output part 240 on the basis of the determination result.

For instance, when the information processing device 200 and the imaging device 100 are connected through the wireless communication part 230, the control part 250 displays at the input/output part 240 a display screen which displays various pieces of information related to the imaging device 100. In this case, the control part 250 performs control for switching the roles of the operation members (for instance, the operation members 221 to 223 illustrated in FIG. 2) included in the information processing device 200 on the basis of relative positional relationship with the imaging device 100. For instance, the control part 250 performs control for switching the roles of the operation members on the basis of whether or not the imaging device 100 is mounted on the information processing device 200. In this case, for instance, when the imaging device 100 is not mounted on the information processing device 200, the control part 250 performs control for displaying the operation objects (for instance, operation objects 302 and 307 illustrated FIG. 5a) for operating the imaging device 100 at the input/output part 240. On the other hand, when the imaging device 100 is mounted on the information processing device 200, the control part 250 performs control for allocating the roles corresponding to those operation objects to operation members (for instance, operation members 221 and 222 illustrated in FIG. 5b), and deleting those operation objects from the input/output part 240.

Specifically, when the imaging device 100 is not mounted, the control part 250 displays both the operation object 307 for performing zoom operation of the imaging device 100 and the operation object 302 for performing shutter operation of the imaging device 100 at the input/output part 240. On the other hand, when the imaging device 100 is mounted on the information processing device 200, the control part 250 performs control for allocating the role of performing zoom operation to the operation member 222 configured to adjust the sound volume of the information processing device 200. The control part 250 also performs control for allocating the role of performing shutter operation of the imaging device 100 to the operation member 221 configured to perform shutter operation of the information processing device 200. For instance, the control part 250 can manage each of the operation members and the roles allocated thereto by using a table which records the respective operation members and the rolls allocated thereto in association with each other.

For instance, when the roles of the operation members are switched, the control part 250 performs control for outputting notification information (for instance, notification information 311 and 312 illustrated in FIG. 6a, notification information 313 illustrated in FIG. 6b) to indicate the switching.

In this way, in the information processing device 200, the roles of the operation members included in the information processing device 200 are switched on the basis of the relative positional relationship between the imaging device 100 and the information processing device 200 which are connected utilizing the wireless communication. Also, the control part 140 of the imaging device 100 controls imaging operation on the basis of the operational input performed in the information processing device 200 by using the operation members having the rolls being switched or the display screen displayed at the display part 242.

The image processing part 260 executes predetermined image processing for the image generated by the imaging device 100 and the image generated by the imaging part 292 (illustrated in FIG. 2a and FIG. 2b) under the control of the control part 250, and makes the display part 242 display the image subjected to the image processing. Also, the image processing part 260 stores the images in the storage part 270 under the control of the control part 250. Also, the image processing part 260 makes the display part 242 display the display screen to be used when the imaging operation using the imaging device 100 is being performed, under the control of the control part 250.

The storage part 270 is a recording medium that stores individual pieces of information under the control of the control part 250. For instance, in the storage part 270, the image generated by the imaging device 100 and the image generated by the imaging part 292 (illustrated in FIG. 2a and FIG. 2b) are stored as contents (for instance, the still image file, the moving image file). The storage part 270 may be built in the information processing device 200 or may be attachable and detachable to/from the information processing device 200.

The sound output part 280 outputs sound information under the control of the control part 250. The sound output part 280 can be embodied by a speaker, for instance.

[Use Example of Imaging Device and Information Processing Device]

FIG. 4 is a diagram illustrating a use example of the imaging device 100 and the information processing device 200 in the first embodiment of the present technology.

In FIG. 4a, one example in the case of using the imaging device 100 mounted on the information processing device 200 is illustrated. For instance, as illustrated in FIGS. 2a and 2b, the imaging device 100 can be mounted on one surface (a surface opposite to the surface having the input/output part 240 provided thereon) of the information processing device 200. In this case, the user 400 can take a photograph in substantially a similar way as in the case of taking a photograph with a general imaging device (for instance, an incorporated type camera) by using the information processing device 200 having the imaging device 100 mounted thereon.

In FIG. 4b, one example in the case of using the information processing device 200 without the imaging device 100 mounted thereon is illustrated. For instance, as illustrated in FIG. 4b, the imaging device 100 may be provided at a position away from the information processing device 200. Even in this case, the user 400 can remotely control the imaging device 100 by using the information processing device 200, so that a photograph can be taken with the imaging device 100 and the information processing device 200.

Here, it is assumed that a use form of the information processing device 200 (for instance, how to hold the device) is different between in the case of mounting the imaging device 100 on the information processing device 200 and in other cases. Accordingly, in the first embodiment of the present technology, an example is described in which the roles of the operation members included in the information processing device 200 are switched on the basis of the relative positional relationship between the imaging device 100 and the information processing device 200.

[Example of Determining Connection Relation Between Imaging Device and Information Processing Device]

Here, a method of determining connection relation between the imaging device 100 and the information processing device 200 will be described.

[Example of Estimating Distance Using Reception Radio Field Intensity]

For instance, a distance between the imaging device 100 and the information processing device 200 can be estimated using reception radio field intensity. For instance, a table indicating relationship between the reception radio field intensity and the distance is prepared, and stored in the storage part 270. Then, the control part 250 of the information processing device 200 acquires the distance corresponding to the reception radio field intensity acquired by the wireless communication part 230 from the table, and can use the distance as the distance between the imaging device 100 and the information processing device 200. Also, when the distance acquired from the table is shorter than a threshold (for instance, 1 to 10 cm), the control part 250 of the information processing device 200 can determine that the imaging device 100 is mounted on the information processing device 200.

[Example of Using Member for Detecting Mounting]

For instance, mounting of the imaging device 100 can be detected using a member for detecting that the imaging device 100 is mounted on the information processing device 200. As the member, for instance, a switch can be provided on at least one of the imaging device 100 and the information processing device 200.

For instance, the case of providing the switch on the imaging device 100 is assumed. In this case, when the imaging device 100 is mounted on the information processing device 200, the mounting is detected by the switch, and information indicating that the mounting is detected is output to the control part 140. Then, when the information indicating that the mounting is detected is acquired, the control part 140 transmits that effect to the information processing device 200 through the wireless communication part 150. Thus, the control part 250 of the information processing device 200 can detect that the imaging device 100 is mounted on the information processing device 200.

Also, for instance, the case of providing the switch on the information processing device 200 is assumed. In this case, when the imaging device 100 is mounted on the information processing device 200, the mounting is detected by the switch, and the information indicating that the mounting is detected is output to the control part 250. Thus, the control part 250 of the information processing device 200 can detect that the imaging device 100 is mounted on the information processing device 200.

Also, the distance between the imaging device 100 and the information processing device 200 may be detected using another sensor. For instance, a distance sensor (for instance, a sensor which detects the distance using infrared rays or ultrasonic waves) may be used. Also, for instance, the distance between the imaging device 100 and the information processing device 200 may be detected using a global positioning system (GPS). For instance, respective positions of the imaging device 100 and the information processing device 200 are acquired using the GPS, and the distance between the imaging device 100 and the information processing device 200 can be calculated on the basis of these positions. Also, when the calculated distance is shorter than the threshold (for instance, 1 to 10 cm), the control part 250 of the information processing device 200 can determine that the imaging device 100 is mounted on the information processing device 200.

[Example of Detecting Mounting of Imaging Device Using Short-Range Wireless Communication]

For instance, mounting of the imaging device 100 with the information processing device 200 can be detected using short-range wireless communication. Here, an example of using near field communication (NFC) as the short-range wireless communication is illustrated.

For instance, in the NFC, periodical communication is performed between the devices. For instance, a polling command is issued periodically from the information processing device 200. The polling command is a command for discriminating an NFC tag determined by an NFC standard (for instance, see NFC Forum Type3 Tag Operation Specification NFC Forum-TS-Type-3-Tag_1.1).

For instance, when there is a response (polling response) to the periodically issued polling command, the information processing device 200 can determine that an adjacent device exists. Here, a distance at which data communication utilizing the NFC is possible is about 1 to 10 cm. Accordingly, when there is the polling response, the control part 250 of the information processing device 200 can determine that the imaging device 100 is mounted on the information processing device 200.

Also, when there is no response (polling response) to the polling command, the information processing device 200 can determine that an adjacent device does not exist. In this case, the control part 250 of the information processing device 200 can determine that the imaging device 100 is not mounted on the information processing device 200.

Here, the NFC is widely spread. Also, the NFC is often loaded on an information processing device such as a smartphone. Therefore, in the case of the information processing device loaded with the NFC, by detecting the mounting using the NFC, hardware may not necessarily be newly provided for performing the detection. Thus, a manufacturing cost of the information processing device can be reduced.

Here, for instance, it is also assumed that the imaging device is not mounted on the information processing device and the imaging device and the information processing device are adjacent. In such a case, when mounting is detected using the short-range wireless communication other than the NFC, there is a risk of erroneous detection that the imaging device is mounted. Then, in the embodiment of the present technology, the NFC is used as the short-range wireless communication. Thus, accuracy of detecting mounting of the imaging device can be improved.

[Example of Detecting Mounting of Imaging Device Using Check Command and Check Response]

The example of detecting mounting of the imaging device using the NFC is illustrated above. When detecting mounting of the imaging device using the NFC in this way, mounting of the imaging device may be detected using a check command and a check response.

For instance, the check command and the check response are exchanged, and when specifying information is included in the check response, it can be determined that the imaging device 100 is mounted on the information processing device 200. Here, the specifying information is information (identification information) for specifying the imaging device 100. Also, the check command and the check response are commands for reading contents of an NFC tag. The command is defined in NFC Forum Type3 Tag Operation Specification.

For instance, as described above, the polling command is issued and a response (polling response) to the polling command is exchanged.

Then, when the polling response is received, the control part 250 of the information processing device 200 transmits the check command. When the check command is received, the control part 140 of the imaging device 100 transmits a response (check response) to the check command. In this case, the control part 140 of the imaging device 100 includes the specifying information (the information (identification information) for specifying the imaging device 100) in the check response and transmits it.

For instance, information indicating "ABC DSC/Lens-Style Camera" can be included in the check response and transmitted as the specifying information. Here, for instance, it is assumed that "ABC" is information indicating a name of a company which manufactures the imaging device 100, and "DSC" is information indicating that it is the imaging device. Also, it is assumed that "Lens-Style Camera" is information indicating that it is a lens style camera.

In this way, the control part 140 of the imaging device 100 includes the specifying information in the check response and transmits it. Thus, the information processing device 200 which receives the check response can recognize that the device which has transmitted the check response is the imaging device 100 on the basis of the specifying information included in the check response. That is, it can be recognized that the device which has transmitted the check response is the lens style camera (the imaging device 100) made by the company "AAA".

When the check response is received, the control part 250 of the information processing device 200 acquires contents of the check response. Subsequently, the control part 250 of the information processing device 200 determines whether or not the specifying information is included in the check response. Then, when the specifying information is included in the check response, the control part 250 of the information processing device 200 determines that the imaging device 100 is mounted on the information processing device 200. On the other hand, when the specifying information is not included in the check response, the control part 250 of the information processing device 200 determines that the imaging device 100 is not mounted on the information processing device 200.

The above-described distance detection method and mounting detection method are examples, and other detection methods may be used without being limited to these methods.

[Example of Switching Operation Member]

FIG. 5 is a diagram illustrating a display screen displayed at the input/output part 40 and an example of switching the operation members in the first embodiment of the present technology.

An example in the case where the imaging device 100 is not mounted on the information processing device 200 is illustrated in FIG. 5a, and an example in the case where the imaging device 100 is mounted on the information processing device 200 is illustrated in FIG. 5b.

In the example illustrated in FIG. 5, when an imaging operation using the imaging device 100 and the information processing device 200 is performed, an image generated by the imaging part 110 of the imaging device 100 is displayed at the input/output part 240 as a live view image. That is, images generated by the imaging part 110 of the imaging device 100 are sequentially transmitted to the information processing device 200 through the wireless communication parts 150 and 230, and are displayed at the input/output part 240 as a live view image. Also, image data and control data can be exchanged between the imaging device 100 and the information processing device 200 utilizing the Wi-Fi. In the example illustrated in FIG. 5, images having mountains as objects are displayed as a live view image 300.

In the example illustrated in FIG. 5, when the imaging operation using the imaging device 100 and the information processing device 200 is performed, operation objects for operating the imaging device 100 are displayed at the input/output part 240. The operation objects are displayed, for instance, around the live view image, or overlaid and displayed on the live view image at the input/output part 240.

Also in the example illustrated in FIG. 5, a live view image 300 is displayed, a plurality of operation objects 301 to 304 are displayed on both the sides of the live view image 300, and a plurality of operation objects 305 to 307 are overlaid and displayed on the live view image 300. In FIG. 5, description is given under the assumption that the user is right-handed.

The operation object 301 is an operation object pressed when a photographing mode of the imaging device 100 is switched. The operation object 302 is an operation object pressed when the shutter operation of the imaging device 100 is performed. The operation object 303 is an operation object pressed when various kinds of setting operations of the imaging device 100 are performed. The operation object 304 is an operation object pressed when reproduction of an image is performed. The operation objects 305 and 306 are operation objects for displaying various kinds of setting information on the imaging device 100 to change each of the settings.

The operation object 307 is an operation object for performing zoom operation of the imaging device 100. For instance, as the operation object 307, a wide (W) button (wide-side button) and a tele (T) button (tele-side button) are displayed. For instance, when the user operates the W button or the T button, the control part 250 acquires the control information corresponding to the user operation, and transmits the control information to the control part 140 of the imaging device 100 through the wireless communication parts 230 and 150. Upon reception of the control information, the control part 140 of the imaging device 100 controls drive of the zoom lens of the imaging part 110 on the basis of the received control information.

As described above, the main body of the imaging device 100 includes the operation member (zoom lever) configured to perform the zoom operation and the operation member (shutter button) configured to perform the shutter operation. However, for instance, when the imaging device 100 is not mounted on the information processing device 200, it is also assumed that the operation members (the zoom lever, the shutter release button) included in the main body of the imaging device 100 are beyond the reach of the user. In this case, the user cannot operate the operation members (the zoom lever, the shutter release button) included in the main body of the imaging device 100. Accordingly, as illustrated in FIG. 5a, when the imaging device 100 is not mounted on the information processing device 200, the operation objects 302 and 307 are displayed at portions which are easy to operate for the user (right portions which are easy to operate for the right-handed user). Arranging the operation objects 302 and 307 in this way enables the user to easily perform the zoom operation and the shutter operation with the right thumb.

This enables the user to easily perform the shutter operation and the zoom operation on a UI of the information processing device 200.

Here, assume the case of operating the imaging device 100 with the information processing device 200 when the imaging device 100 is not mounted on the information processing device 200 (when the imaging device 100 is at a distance from the information processing device 200). In this case, it is assumed that the user recognizes and performs the operation (so-called remote control operation) of the imaging device 100 with the information processing device 200. Accordingly, if the roles of the operation members (hardware keys) of the information processing device 200 are changed, the user may possibly be confused.

As a solution, when the imaging device 100 is not mounted on the information processing device 200 (when the imaging device 100 is at a distance from the information processing device 200), the operation objects for operating the imaging device 100 are displayed at the input/output part 240 and be used.

Here, assume the case of operating the imaging device 100 with the information processing device 200 when the imaging device 100 is mounted on the information processing device 200. In this case, it is assumed that the user expects maneuverability to the extent that the user does not feel discomfort in comparison with not the operation (so-called a remote control operation) of the imaging device 100 with the information processing device 200 but with the operation of a general imaging device (for instance, an incorporated type camera). To meet this expectation, the roles of the operation members (hardware keys) of the information processing device 200 are changed to implement the maneuverability corresponding to the general imaging device (for instance, an incorporated type camera).

Hence, the control part 250 of the information processing device 200 switches the role of the operation member 221, from the operation member (shutter button) configured to perform shutter operation of the information processing device 200 to the operation member (shutter button) configured to perform shutter operation of the imaging device 100.

The control part 250 of the information processing device 200 also switches the role of the operation member 222, from the operation member (sound volume adjustment button) configured to adjust the sound volume of the information processing device 200 to the operation member (zoom button) configured to perform zoom operation of the imaging device 100.

As illustrated in FIG. 5b, when the imaging device 100 is mounted on the information processing device 200, the operation objects 304 and 307 illustrated in FIG. 5a are deleted. Instead of deleting the operation objects 304 and 307, the operation objects 304 and 307 may be displayed at portions different from the portions which are easy to operate for the user.

Thus, in the embodiment of the present technology, the roles of the operation members hard keys) included in the information processing device 200 can be switched in accordance with the connection relation between the imaging device 100 and the information processing device 200. That is, the roles of the operation members (hard keys) included in the information processing device 200 can be switched on the basis of the relative positional relationship between the imaging device 100 and the information processing device 200. This makes it possible to effectively utilize the operation members (hard keys) included in the information processing device 200, so that the maneuverability can be enhanced.

[Example of Notifying Switching of Operation Member]

In the foregoing, the example has been described in which the roles of the operation members (hard keys) included in the information processing device 200 can be switched in accordance with the connection relation between the imaging device 100 and the information processing device 200. In the case of switching the roles in this way, it is also assumed that the user does not grasp the switching. Accordingly, in an example described hereinafter, when the roles of the operation members (hard keys) included in the information processing device 200 are switched, the switching is notified.

Figure 6:
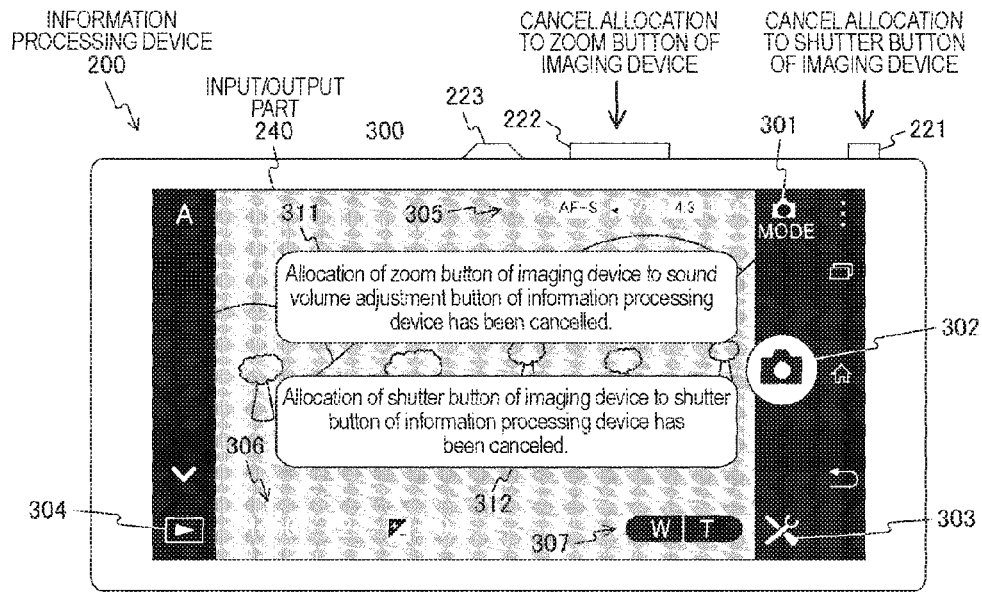
FIG. 6 is a diagram illustrating a display screen displayed at an input/output part 240 and an example of switching the operation members in the first embodiment of the present technology.

FIG. 6 is a diagram illustrating a display screen displayed at the input/output part 240 and an example of switching the operation members in the first embodiment of the present technology.

An example in the case where the imaging device 100 is not mounted on the information processing device 200 is illustrated in FIG. 6a, and an example in the case where the imaging device 100 is mounted on the information processing device 200 is illustrated in FIG. 6b.

FIG. 6a is similar to the example illustrated in FIG. 5a except for the point that the notification information 311 and 312 are displayed. FIG. 6b is also similar to FIG. 5b except for the point that the notification information 313 is displayed. Hence, difference between FIG. 5a and FIG. 5b is mainly described here.

The notification information 313 illustrated in FIG. 6b is information indicating that the roles of the operation members 221 and 222 were switched. For instance, it is possible to display a message indicative of the switching of the roles of the operation members 221 and 222 and arrows that point the operation members 221 and 222, the roles of which were switched. This enables the user to easily grasp that the roles of the operation members 221 and 222 were switched in a visual way.

The notification information 311 illustrated in FIG. 6a is information indicating that the role of the operation member 222 was switched back. The notification information 312 illustrated in FIG. 6a is information indicating that the role of the operation member 221 was switched back. For instance, a messages indicating that the roles of the operation members 221 and 222 were switched back can be displayed. This enables the user to easily grasp that the roles of the operation members 221 and 222 were switched back in a visual way. As in FIG. 6b, arrows that point the operation members 221 and 222, the roles of which were switched back, may be displayed.

Although FIG. 6 illustrates the example in which the notification information is displayed to notify the user of the switching of the roles of the operation members, the switching of the roles of the operation members may be notified to the user by outputting the notification information by sound.

The example of switching the roles of these operation members is merely an example, and the roles of other operation members may also be switched.

[Operation Example of Information Processing Device]

Figure 7:
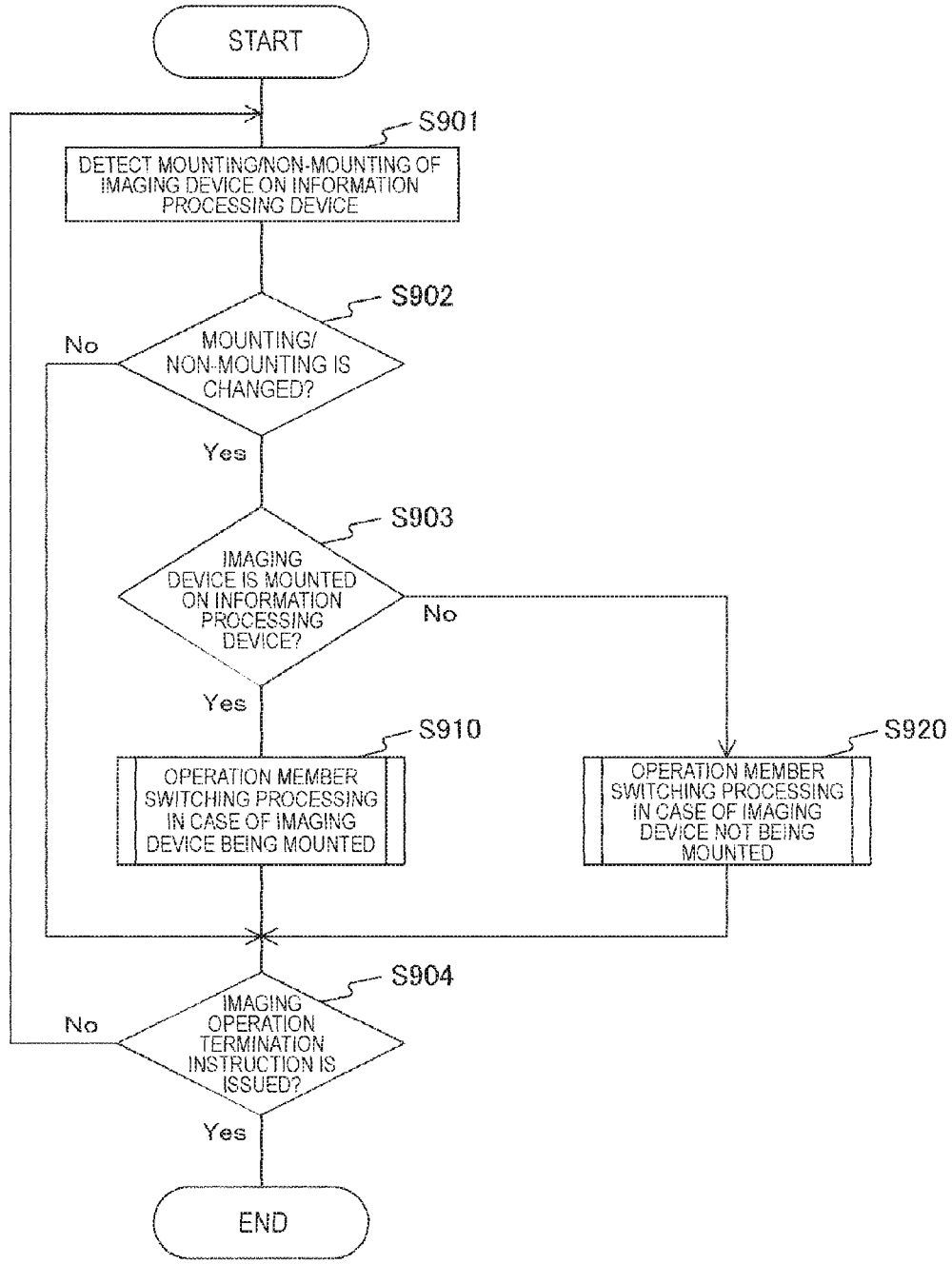
FIG. 7 is a flow chart illustrating one example of processing procedures of operation member switching processing by the information processing device 200 in the first embodiment of the present technology.

FIG. 7 is a flow chart illustrating one example of processing procedures of operation member switching processing performed by the information processing device 200 in the first embodiment of the present technology. In FIG. 7, an example is illustrated in which the roles of the operation members are switched on the basis of mounting/non-mounting of the imaging device 100 on the information processing device 200.

First, the control part 250 detects mounting/non-mounting of the imaging device 100 on the information processing device 200 (step S901).

The control part 250 then determines whether or not the mounting/non-mounting of the imaging device 100 on the information processing device 200 is changed (step S902). The case where the mounting/non-mounting is changed refers to the case where, for instance, the state of the imaging device 100 mounted on the information processing device 200 is changed to the state of the imaging device 100 not mounted on the information processing device 200, or refers to the case where the state of the imaging device 100 not mounted on the information processing device 200 is changed to the state of the imaging device 100 mounted on the information processing device 200. When the mounting/non-mounting is not changed (step S902), the processing proceeds to step S904.

When mounting/non-mounting is changed (step S902), the control part 250 determines whether or not the changed state is the state where the imaging device 100 is mounted on the information processing device 200 (step S903). When the changed state is the state where the imaging device 100 is mounted on the information processing device 200 (step S903), the control part 250 performs operation member switching processing in the case of the imaging device 100 being mounted on the information processing device 200 (step S910). The operation member switching processing will be described in detail with reference to FIG. 8.

When the changed state is the state where the imaging device 100 is not mounted on the information processing device 200 (step S903), the control part 250 performs operation member switching processing in the case of the imaging device 100 being not mounted on the information processing device 200 (step S920). The operation member switching processing will be described in detail with reference to FIG. 9.

Next, the control part 250 determines whether or not an imaging operation termination instruction is issued (step S904), and when the imaging operation termination instruction is not issued, the processing returns to step S901. When the imaging operation termination instruction is issued, the operation of the display control processing is ended.

Steps S902, S903, S910, and S920 are examples of the procedures to perform control of switching the roles of the operation members included in the information processing device 200 on the basis of relative positional relationship with the imaging device 100.

The first embodiment of the present technology is one example of the control method for the imaging device 100 to control imaging operation on the basis of an operational input performed in the information processing device 200 by using the operation members or the display screen displayed at the input/output part 240.

Figure 8:
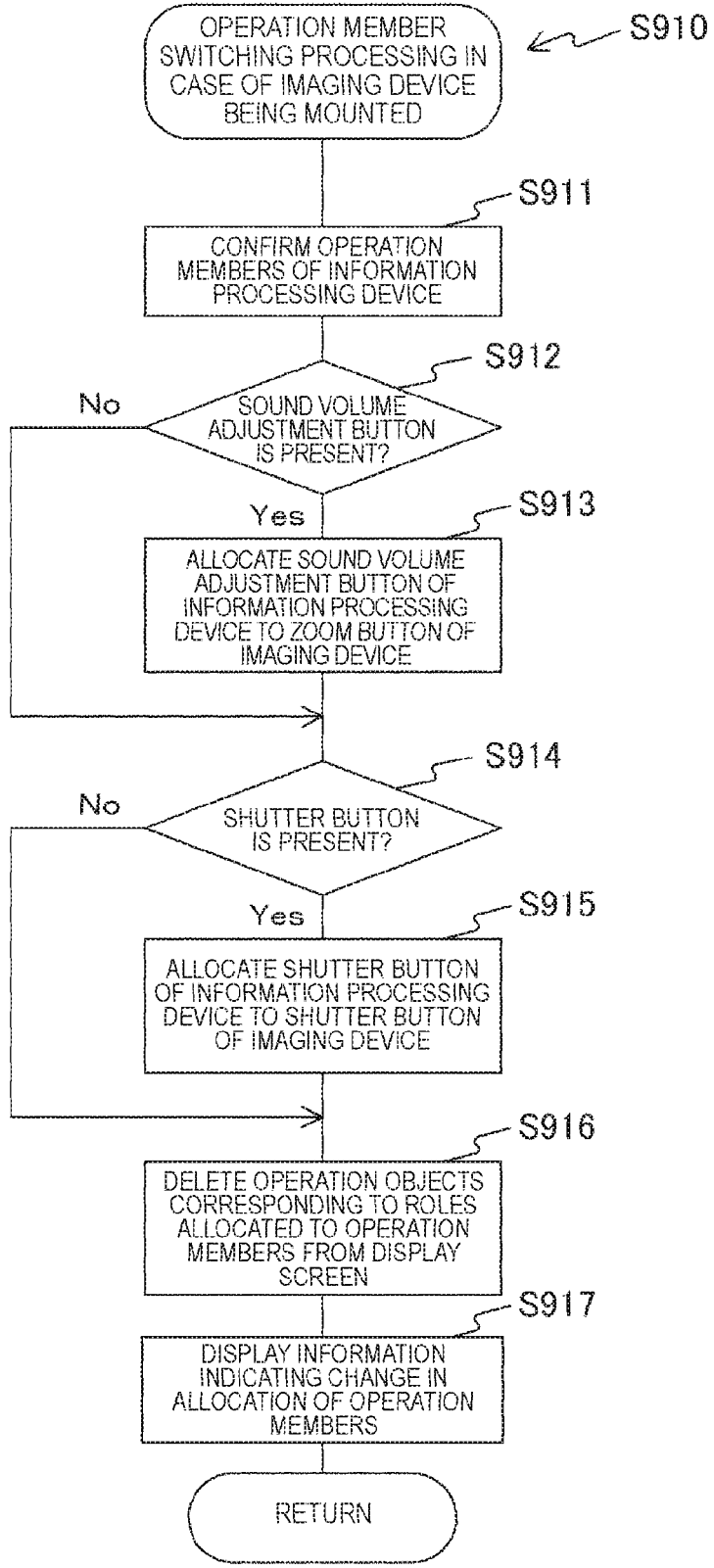
FIG. 8 is a flow chart illustrating operation member switching processing (processing procedures of step S910 illustrated in FIG. 7) in the case where the imaging device 100 is mounted, among the processing procedures of the operation member switching processing by the information processing device 200 in the first embodiment of the present technology.

FIG. 8 is a flow chart illustrating operation member switching processing (processing procedures of step S910 illustrated in FIG. 7) in the case where the imaging device 100 is mounted, among the processing procedures of the operation member switching processing by the information processing device 200 in the first embodiment of the present technology. In FIG. 8, an example is illustrated in which when the roles of the operation members are switched, the notification information indicative of the switching is displayed.

First, the control part 250 confirms the operation members included in the information processing device 200 (step S911). That is, the hard keys included in the information processing device 200 are checked (step S911).

Next, the control part 250 determines whether or not a sound volume adjustment button is present in the information processing device 200 (step S912). When the sound volume adjustment button is not present in the information processing device 200, the processing proceeds to step S914. When the sound volume adjustment button is present in the information processing device 200 (step S912), the control part 250 allocates the role of the zoom button of the imaging device 100 to the sound volume adjustment button of the information processing device 200 (step S913). For instance, as illustrated in FIGS. 5b and 6b, the sound volume adjustment button (operation member 222) is present in the information processing device 200, and therefore the role of the zoom button of the imaging device 100 is allocated to the sound volume adjustment button (operation member 222) (step S913).

Next, the control part 250 determines whether or not the shutter button is present in the information processing device 200 (step S914). When the shutter button is not present in the information processing device 200, the processing proceeds to step S916. When the shutter button is present in the information processing device 200 (step S914), the control part 250 allocates the role of the shutter button of the imaging device 100 to the shutter button of the information processing device 200 (step S915). For instance, as illustrated in FIGS. 5a, and 6a, the shutter button (operation member 221) is present in the information processing device 200, and therefore the role of the shutter button of the imaging device 100 is allocated to the shutter button (operation member 221) (step S915).

Next, the control part 250 deletes the operation objects corresponding to the roles newly allocated to the operation members from the input/output part 240 (step S916). For instance, when the roles of the sound volume adjustment button and the shutter button are switched, the operation objects 302 and 307 are deleted from the input/output part 240 as illustrated in FIGS. 5b and 6b.

Next, the notification information indicating that the roles of the operation members were switched is displayed at the input/output part 240 (step S917). For instance, when the roles of the sound volume adjustment button and the shutter button are switched, the notification information 313 is displayed as illustrated in FIG. 6b.

Figure 9:
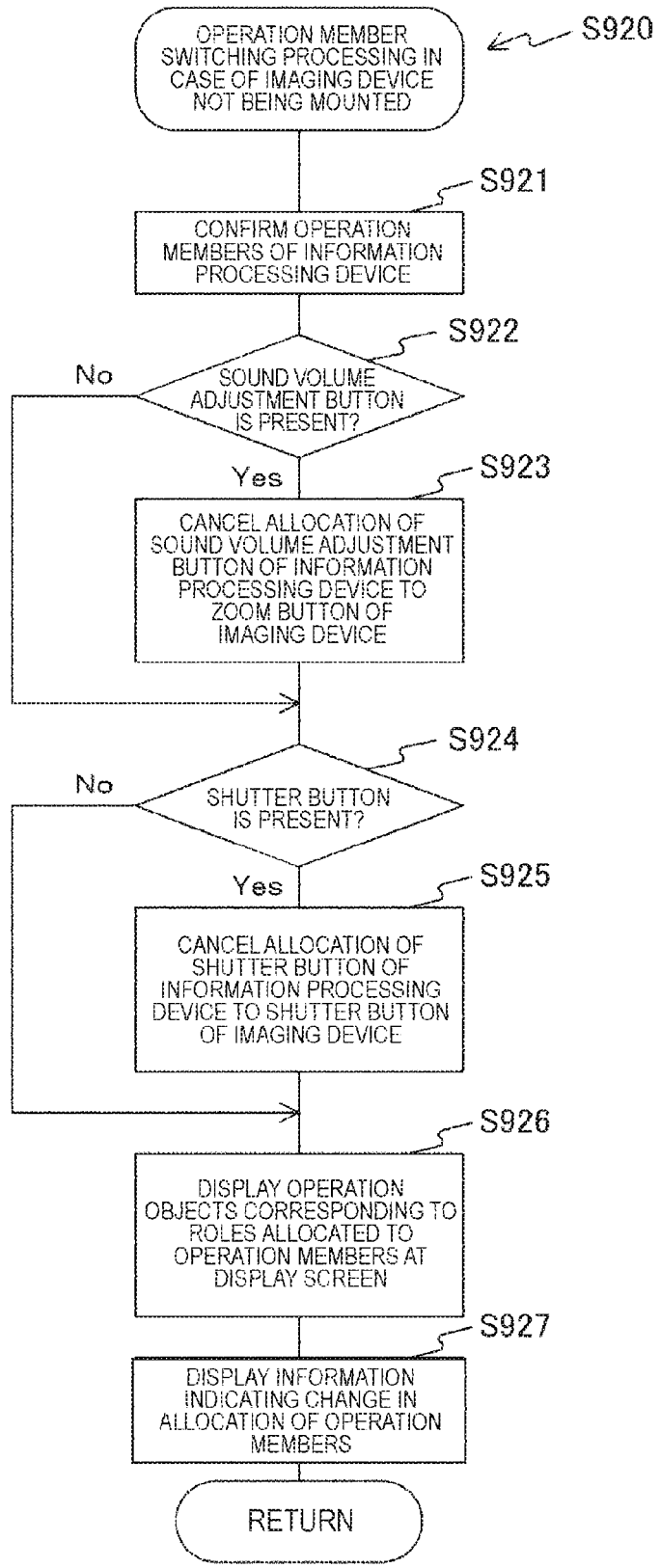
FIG. 9 is a flow chart illustrating the operation member switching processing (processing procedures of step S920 illustrated in FIG. 7) in the case where the imaging device 100 is not mounted, among the processing procedures of the operation member switching processing by the information processing device 200 in the first embodiment of the present technology.

FIG. 9 is a flow chart illustrating the operation member switching processing (processing procedures of step S920 illustrated in FIG. 7) in the case where the imaging device 100 is not mounted, among the processing procedures of the operation member switching processing by the information processing device 200 in the first embodiment of the present technology. In FIG. 9, an example is illustrated in which the notification information is displayed which indicates that the roles of the operation members were switched back.

First, the control part 250 confirms the operation members included in the information processing device 200 (step S921). That is, the hard keys included in the information processing device 200 are checked (step S921).

Next, the control part 250 determines whether or not the sound volume adjustment button is present in the information processing device 200 (step S922). When the sound volume adjustment button is not present in the information processing device 200, the processing proceeds to step S924. When the sound volume adjustment button is present in the information processing device 200 (step S922), the control part 250 switches back the role of the sound volume adjustment button of the information processing device 200 (step S923). That is, allocation of the sound volume adjustment button of the information processing device 200 to the zoom button of the imaging device 100 is canceled (step S923).

Next, the control part 250 determines whether or not the shutter button is present in the information processing device 200 (step S924). When the shutter button is not present in the information processing device 200, the processing proceeds to step S926. When the shutter button is present in the information processing device 200 (step S924), the control part 250 switches back the role of the shutter button of the information processing device 200 (step S925). That is, allocation of the shutter button of the information processing device 200 to the shutter button of the imaging device 100 is canceled (step S925).

Next, the control part 250 displays at the input/output part 240 the operation objects corresponding to the roles allocated to the operation members, the rolls of which were switched back (step S926). For instance, when the roles of the sound volume adjustment button and the shutter button were switched back, the operation objects 302 and 307 are displayed at the display screen as illustrated in FIGS. 5a, and 6a.

Next, the notification information indicating that the roles of the operation members were switched back is displayed at the input/output part 240 (step S927). For instance, when the roles of the sound volume adjustment button and the shutter button are switched back, the notification information 311 and 312 are displayed as illustrated in FIG. 6a.

2. Second Embodiment

In the first embodiment of the present technology, the example has been described in which the roles of the operation members included in the information processing device are switched on the basis of the relative positional relationship between the imaging device and the information processing device. Here, it is assumed that in the case of mounting the imaging device on the information processing device, the user may unintentionally touch an operation member included in the information processing device during the mounting work. Even when the user unintentionally touches the operation member in this way, it is important to prevent malfunction due to the operation member unintentionally touched by the user.

Accordingly, in the second embodiment of the present technology, an example will be described in which malfunction caused by the contact of the operation member is prevented when the imaging device is mounted on the information processing device. The configuration of the imaging device and the information processing device in the second embodiment of the present technology is identical to the configuration of the imaging device 100 and the information processing device 200 illustrated in FIGS. 1 to 3. Accordingly, respective devices in the second embodiment of the present technology are designated by reference signs identical to those in the first embodiment of the present technology, and the description thereof is partially omitted.

[Example of Operation Switching by Pressing Operation of Power Button]

FIG. 10 is a diagram illustrating an example of operation switching by pressing operation of the operation member 223 (power button) in the second embodiment of the present technology. In FIG. 10, an example is illustrated in which operation is switched by pressing operation of the operation member 223 (power button). In FIG. 10, the example is illustrated in which short-pressing operation and long-pressing operation are performed as the pressing operation. The long-pressing operation refers to one pressing operation for relatively long time (for instance, about 3 to 5 seconds). The short-pressing operation refers to one pressing operation for shorter time than long-pressing operation.

Figure 11:
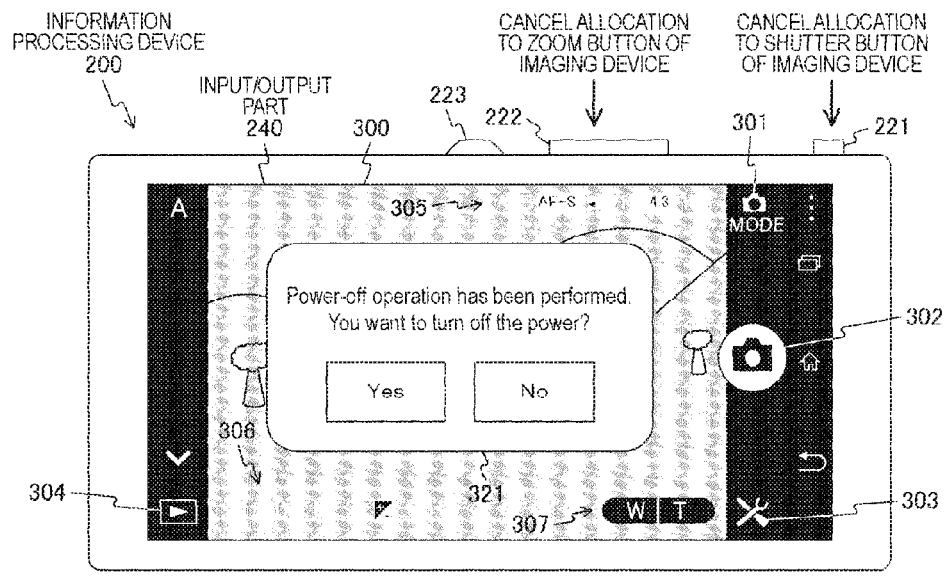
FIG. 11 is a diagram illustrating a display screen displayed at the input/output part 240 and an example of switching the operation members in the second embodiment of the present technology.

FIG. 11 is a diagram illustrating the display screen displayed at the input/output part 240 and an example of switching the operation members in the second embodiment of the present technology.

An example in the case where the imaging device 100 is not mounted on the information processing device 200 is illustrated in FIG. 11a, and an example in the case where the imaging device 100 is mounted on the information processing device 200 is illustrated in FIG. 11b.

FIG. 11a is similar to the example illustrated in FIG. 5a except for the point that a confirmation screen 321 is displayed. FIG. 11b is also similar to FIG. 5b except for the point that a confirmation screen 322 is displayed. Hence, difference between FIG. 5a and FIG. 5b is mainly described here.

Confirmation screens 321 and 322 illustrated in FIGS. 11a and 11b are confirmation screens for confirming whether to turn off the power (confirmation dialogs whether to turn off the power).

For instance, when the operation member 223 (power button) is short-pressed in the case when the work of mounting the imaging device 100 on the information processing device 200 is not performed (normal time), the display screen displayed at the input/output part 240 is turned off. When the operation member 223 (power button) is short-pressed after the display screen is turned off, a lock screen is displayed at the input/output part 240. For instance, the lock screen is a display screen for notifying that prescribed operation (for instance, touch operation at the input/output part 240) is limited. To cancel the lock screen, specific cancel operation needs to be made.

Here, as described in the foregoing, when the user is performing the work of mounting the imaging device 100 on the information processing device 200, there is a possibility that the user may erroneously press the operation member 223 of the information processing device 200. In this case, it is assumed that the operation member 223 is pressed only for relatively short time for instance. If the display screen displayed at the input/output part 240 is turned off in this case, the user who is performing the work is assumed to be troubled. Also, if the operation member 223 (power button) is short-pressed again after the display screen is turned off, the lock screen is displayed at the input/output part 240. Since it is necessary to perform specific cancel operation to cancel the lock screen as described before, performing the cancel operation during the work may possibly be troublesome.

Accordingly, when the short-pressing operation of the operation member 223 (power button) is performed during the work of mounting the imaging device 100 on the information processing device 200, the short-pressing operation is made invalid. As a result, even in the case where the user who is performing the work of mounting the imaging device 100 on the information processing device 200 erroneously presses the operation member 223, the user can smoothly continue the work without interruption. Whether or not the work of mounting the imaging device 100 on the information processing device 200 is in operation can be determined on the basis of, for instance, a distance between the imaging device 100 and the information processing device 200 or the like. For instance, when the state where the distance between the imaging device 100 and the information processing device 200 is less than a threshold continues for a definite period of time or more, it can be determined that the work of mounting the imaging device 100 on the information processing device 200 is in operation.

For instance, when long-pressing operation of the operation member 223 (power button) is performed in the case where the work of mounting the imaging device 100 on the information processing device 200 is not in operation (normal time), a confirmation screen for confirming whether to turn off the power is displayed at the input/output part 240. The confirmation screen is, for instance, a confirmation dialog for confirming whether to turn off the power. For instance, as illustrated in FIG. 11a, the confirmation screen 321 is displayed at the input/output part 240.

Also, when long-pressing operation of the operation member 223 (power button) is performed similarly in the case where the work of mounting the imaging device 100 on the information processing device 200 is in operation, the confirmation screen for confirming whether to turn oft the power is displayed at the input/output part 240. For instance, as illustrated in FIG. 11b, the confirmation screen 322 is displayed at the input/output part 240. While the work of mounting the imaging device 100 on the information processing device 200 is in operation, the time of pressing the operation member 223 (power button) for displaying the confirmation screen may be set longer than in the normal time.

Thus, in the second embodiment of the present technology, in the case where the work of mounting the imaging device 100 on the information processing device 200 is in operation, the confirmation screen is displayed only at the time when long-pressing operation of the operation member 223 (power button) is performed. This makes it possible to prevent malfunction in the case where the user erroneously touches the power button of the information processing device 200 during the work of mounting the imaging device 100 on the information processing device 200.

Although the example in which the confirmation screen is displayed to notify the user of execution of the long-pressing operation of the operation member 223 (power button) is illustrated in FIG. 11, it is also possible to output the notification by sound to notify the user.

Thus, in the embodiment of the present technology, it is possible to appropriately control validity/invalidity of the operation members (hard keys) in the information processing device 200 on the basis of the connection relation between the imaging device 100 and the information processing device 200. That is, it is possible to provide an appropriate user interface corresponding to the use form of the imaging device 100 and the information processing device 200.

While the embodiment of the present technology is described taking a cylindrical (columnar) imaging device 100 as an example, the embodiment of the present technology is applicable also to the imaging devices in other shapes, that can be attached to the other device. Also, the embodiment of the present technology is described taking the information processing device 200 such as a smartphone or table terminal or the like as an example, the embodiment of the present technology is applicable also to the other devices that can be connected with the imaging device utilizing the wireless communication.

Also, the above-described embodiment illustrates one example for realizing the present technology, and matters in the embodiment and technology specifying matters in the scope of claims have correspondence relation respectively.

Similarly, the technology specifying matters in the scope of claims and the matters in the embodiment of the present technology, to which the same names are attached, have the correspondence relation respectively. However, the present technology is not limited to the embodiment and can be realized by variously modifying the embodiment without departing from the spirit of the technology.

Also, the processing procedures described in the above embodiment may be recognized as a method having a series of the procedures, or may be recognized as a program for making a computer execute a series of the procedures or a non-transitory computer-readable recording medium having the program recorded thereon. As the recording medium, for instance, a computer disc (CD), a minidisc (MD), a digital versatile disc (DVD), a memory card, and a Blu-ray® disc or the like are usable.

Effects described in the present description are just examples, the effects are not limited, and there may be other effects.

Additionally, the present technology may also be configured as belo.

(1)

An information processing device, including:

a control part configured to perform control for switching a role of an operation member included in the information processing device on a basis of relative positional relationship with an imaging device.

(2)

The information processing device according to (1), wherein the control part performs control for switching the role of the operation member on a basis of whether or not the imaging device is mounted on the information processing device.

(3)

The information processing device according to (2), wherein the control part performs control for displaying at a display part an operation object for operating the imaging device when the imaging device is not mounted on the information processing device, and for allocating a role corresponding to the operation object to the operation member and deleting the operation object from the display part when the imaging device is mounted on the information processing device.

(4)

The information processing apparatus according to (3), wherein the control part performs control for displaying at the display part both an operation object for performing zoom operation of the imaging device and an operation object for performing shutter operation of the imaging device when the imaging device is not mounted on the information processing device, and for allocating a role of performing the zoom operation to the operation member configured to adjust a sound volume of the information processing device, and allocating a role of performing the shutter operation to the operation member configured to perform shutter operation of the information processing device when the imaging device is mounted on the information processing device.

(5)

The information processing device according to any of (1) to (4), wherein when the role of the operation member is switched, the control part performs control for outputting notification information to indicate the switching.

(6)

An imaging device, including:
a control part configured to control imaging operation on a basis of an operational input performed in an information processing device, the information processing device including an operation member having a role being switched on a basis of relative positional relationship between the imaging device and the information processing device.

(7)

The information processing device according to (6), wherein
the role of the operation member is switched on a basis of whether or not the imaging device is mounted on the information processing device.

(8)

The information processing device according to (7), wherein
an operation object for operating the imaging device is displayed at the display part when the imaging device is not mounted on the information processing device, and a role corresponding to the operation object is allocated to the operation member, and the operation object is deleted from the display part when the imaging device is mounted on the information processing device.

(9)

The information processing device according to (8), wherein
both an operation object for performing zoom operation of the imaging device and an operation object for performing shutter operation of the imaging device are displayed at the display part when the imaging device is not mounted on the information processing device, and when the imaging device is mounted on the information processing device, a role of performing the zoom operation is allocated to the operation member configured to adjust a sound volume of the information processing device, and a role of performing the shutter operation is allocated to the operation member configured to perform shutter operation of the information processing device.

(10)

The information processing device according to any of (6) to (9), wherein
when the role of the operation member is switched, notification information to indicate the switching is output from the information processing device.

(11)

An imaging system, including:
an imaging device configured to be connected to an information processing device by utilizing wireless communication so that imaging operation is controlled on a basis of an operational input performed in the information processing device; and
the information processing device configured to perform control for switching a role of an operation member included in the information processing device on a basis of relative positional relationship with the imaging device.

(12)

A control method for an information processing device, including:
performing control for switching a role of an operation member included in the information processing device on a basis of relative positional relationship with an imaging device.

(13)

A control method for an imaging device, including:
controlling imaging operation on a basis of an operational input performed in an information processing device, the information processing device including an operation member having a role being switched on a basis of relative positional relationship between the imaging device and the information processing device.

(14)

A program for causing a computer execute control for switching a role of an operation member included in an information processing device on a basis of relative positional relationship with an imaging device.

(15)

A program for causing a computer control imaging operation on a basis of an operational input performed in an information processing device, the information processing device including an operation member having a role being switched on a basis of relative positional relationship between an imaging device and the information processing device.

REFERENCE SIGNS LIST 100 imaging device
110 imaging part
120 image processing part
130 storage part
140 control part
150 wireless communication part
160 lens-barrel
171, 172 attachment member
175 mounting surface
200 information processing device
210 posture detection part
220 operation reception part
221-223 operation member
230 wireless communication part
240 input/output part
241 input part
242 display part
250 control part
260 image processing part
270 storage part
280 sound output part
291 light emitting part
292 imaging part

The invention claimed is:

1. An information processing device, comprising:
a control part configured to perform control for switching a role of an operation member included in the information processing device on a basis of relative positional relationship with an imaging device,
wherein the control part performs control for switching the role of the operation member on a basis of whether or not the imaging device is mounted on the information processing device, and
wherein the control part performs control for displaying at a display part an operation object for operating the imaging device when the imaging device is not mounted on the information processing device, and for allocating a role corresponding to the operation object to the operation member and deleting the operation object from the display part when the imaging device is mounted on the information processing device.

2. The information processing apparatus according to claim 1, wherein
the control part performs control for displaying at the display part both an operation object for performing zoom operation of the imaging device and an operation object for performing shutter operation of the imaging device when the imaging device is not mounted on the information processing device, and for allocating a role of performing the zoom operation to the operation member configured to adjust a sound volume of the information processing device, and allocating a role of performing the shutter operation to the operation member configured to perform shutter operation of the information processing device when the imaging device is mounted on the information processing device.

3. The information processing device according to claim 1, wherein
when the role of the operation member is switched, the control part performs control for outputting notification information to indicate the switching.

4. An imaging device, comprising:
a control part configured to control imaging operation on a basis of an operational input performed in an information processing device, the information processing device including an operation member having a role being switched on a basis of relative positional relationship between the imaging device and the information processing device,
wherein the role of the operation member is switched on a basis of whether or not the imaging device is mounted on the information processing device,
and wherein an operation object for operating the imaging device is displayed at a display part when the imaging device is not mounted on the information processing device, and a role corresponding to the operation object is allocated to the operation member, and the operation object is deleted from the display part when the imaging device is mounted on the information processing device.

5. The information processing device according to claim 4, wherein
both an operation object for performing zoom operation of the imaging device and an operation object for performing shutter operation of the imaging device are displayed at the display part when the imaging device is not mounted on the information processing device, and when the imaging device is mounted on the information processing device, a role of performing the zoom operation is allocated to the operation member configured to adjust a sound volume of the information processing device, and a role of performing the shutter operation is allocated to the operation member configured to perform shutter operation of the information processing device.

6. The information processing device according to claim 4, wherein
when the role of the operation member is switched, notification information to indicate the switching is output from the information processing device.

7. An imaging system, comprising:
an imaging device configured to be connected to an information processing device by utilizing wireless communication so that imaging operation is controlled on a basis of an operational input performed in the information processing device; and
the information processing device configured to perform control for switching a role of an operation member included in the information processing device on a basis of relative positional relationship with the imaging device,
wherein the role of the operation member is switched on a basis of whether or not the imaging device is mounted on the information processing device,
and wherein an operation object for operating the imaging device is displayed at a display part when the imaging device is not mounted on the information processing device, and a role corresponding to the operation object is allocated to the operation member, and the operation object is deleted from the display part when the imaging device is mounted on the information processing device.

8. A control method for an imaging device, comprising:
controlling imaging operation on a basis of an operational input performed in an information processing device, the information processing device including an operation member having a role being switched on a basis of relative positional relationship between the imaging device and the information processing device,
wherein the role of the operation member is switched on a basis of whether or not the imaging device is mounted on the information processing device,
and wherein an operation object for operating the imaging device is displayed at a display part when the imaging device is not mounted on the information processing device, and a role corresponding to the operation object is allocated to the operation member, and the operation object is deleted from the display part when the imaging device is mounted on the information processing device.

9. A non-transitory computer readable medium storing program code for switching a role of an operation member included in an information processing device, the program code being executable to perform operations comprising:
performing control, by a control part, for switching the role of the operation member included in the information processing device on a basis of relative positional relationship with an imaging device,
wherein the control part performs control for switching the role of the operation member on a basis of whether or not the imaging device is mounted on the information processing device, and
wherein the control part performs control for displaying at a display part an operation object for operating the imaging device when the imaging device is not mounted on the information processing device, and for allocating a role corresponding to the operation object to the operation member and deleting the operation object from the display part when the imaging device is mounted on the information processing device.

10. A non-transitory computer readable medium storing program code for controlling an information processing device, the program code being executable to perform operations comprising:
controlling, by a control part, imaging operation on a basis of an operational input performed in the information processing device, the information processing device including an operation member having a role being switched on a basis of relative positional relationship between the imaging device and the information processing device,
wherein the role of the operation member is switched on a basis of whether or not the imaging device is mounted on the information processing device,
and wherein an operation object for operating the imaging device is displayed at a display part when the imaging device is not mounted on the information processing device, and a role corresponding to the operation object is allocated to the operation member, and the operation object is deleted from the display part when the imaging device is mounted on the information processing device.

* * * * *